United States Patent [19]
Sakaguchi et al.

[11] 4,132,463
[45] Jan. 2, 1979

[54] ZOOM OPTICAL SYSTEM

[75] Inventors: Keiichi Sakaguchi, Yokohama; Atsushi Someya, Machida, both of Japan

[73] Assignee: Canon Kabushiki Kaisha, Tokyo, Japan

[21] Appl. No.: 737,157

[22] Filed: Oct. 29, 1976

Related U.S. Application Data

[63] Continuation of Ser. No. 565,365, Apr. 7, 1975, abandoned, which is a continuation-in-part of Ser. No. 535,710, Dec. 20, 1974, abandoned, which is a continuation of Ser. No. 410,401, Oct. 29, 1973, abandoned, which is a continuation of Ser. No. 249,615, May 1, 1972, abandoned.

[30] Foreign Application Priority Data

May 8, 1971 [JP] Japan .................. 46/30735
Nov. 18, 1971 [JP] Japan .................. 46/92841

[51] Int. Cl.² ............................ G02B 15/18
[52] U.S. Cl. .................... 350/184; 350/187
[58] Field of Search .............. 350/187, 184–186

[56] References Cited
U.S. PATENT DOCUMENTS

| | | | |
|---|---|---|---|
| 3,613,544 | 10/1971 | Plihal et al. ............... | 350/187 X |
| 3,655,271 | 4/1972 | Suzuki ..................... | 350/187 |
| 3,661,445 | 5/1972 | Someya ..................... | 350/186 |
| 3,731,987 | 5/1973 | Iida et al. ................ | 350/187 |
| 3,773,402 | 11/1973 | Gela et al. ................ | 350/184 |

*Primary Examiner*—Conrad J. Clark
*Attorney, Agent, or Firm*—Toren, McGeady and Stanger

[57] ABSTRACT

A zoom optical system is composed of a positive focusing lens group, a negative variating lens group, a negative compensating lens group and a positive rear fixed lens group. A rotating grooved cam moves the variating lens group and the compensating lens group in a given relation to each other along the optical axis in the normal focusing range. The focusing lens group is moved along the optical axis normal range for focusing. The variating lens group is kept stationary on the optical axis while the compensating lens group is moved along the optical axis during close-range focusing.

15 Claims, 9 Drawing Figures

ZOOM OPTICAL SYSTEM

CROSS-REFERENCE TO RELATED APPLICATIONS

This is a continuation of application Ser. No. 565,365 filed Apr. 7, 1975, now abandoned, which is itself a continuation-in-part application of Ser. No. 535,710 filed Dec. 20, 1974, now abandoned, which in turn was a continuation of Ser. No. 410,401 filed Oct. 29, 1973, now abandoned, which in turn was a continuation of Ser. No. 249,615 filed May 1, 1972, now abandoned.

BACKGROUND OF THE INVENTION

The present invention relates to a zoom optical system.

Conventionally, it has been known to move a relay lens as a method of giving a near-range-focusing function. However, in this case it is difficult to integrate a near-range-focusing mechanism and a zooming mechanism into a unit body because of a finder optical path and a diaphragm mechanism.

SUMMARY OF THE INVENTION

In order to eliminate the above difficulty, at least a compensating lens group of a zoom optical system is given a near-range-focusing function in addition to an image plane shift compensation function at the time of zooming.

One of the objects of the present invention is to improve a zoom optical system composed of a focusing lens group, a negative variator lens group a negative compensating lens group and a positive rear fixed lens groups such as disclosed in Japanese patent publications Sho 44-25423 and Sho 44-22959, and particularly to give the compensating lens group a focusing function at a near-range focusing in addition to the image plane shift compensation function.

Another object of the present invention is to give a near-range-focusing function to a negative compensating lens group of a zoom optical system so as to avoid increased size of a zoom optical system and to enhance its performance.

One embodiment of the present invention shall be described in reference to the attached drawings.

BRIEF DESCRIPTION OF THE DRAWINGS

FIG. 2 shows imaging states of the optical system composed of zoom lens according to the present invention, and (a) indicates use of an ordinary focusing and (b) indicates a near-range-focusing.

DESCRIPTION OF THE INVENTION

Figure 1:
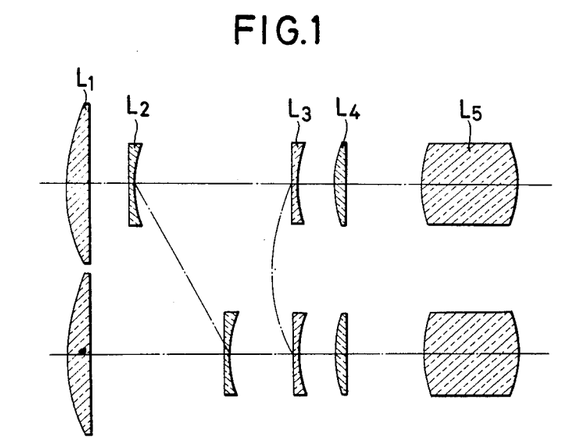
FIG. 1 shows the principle of the conventional optical system composed of zoom lens applicable to the present invention.

The zoom lens system shown in FIG. 1 is composed of a positive focusing lens group, a negative variator lens group, a negative compensating lens group a positive rear fixed lens group and a positive fixed relay lens group in the written order from the front side. The first four lens groups constitute an afocal zoom portion of the zoom lens system, which compensates the shift of the image plane by the reciprocating movement of the compensating lens group.

Figure 2A:
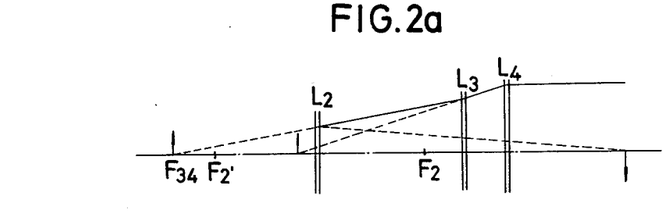
Figure 2B:
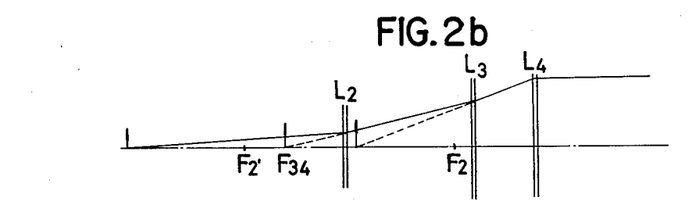

In FIG. 1, the zoom portion is composed of the front positive focusing lens group $L_1$, the negative variator lens group $L_2$, the negative compensating lens group $L_3$, the positive rear fixed lens $L_4$, the groups up to the fixed lens $L_4$ form the afocal zoom portion. $L_5$ is the positive fixed relay lens group. In such a structure the image magnification of the negative variator lens group $L_2$ must have a positive value for near-range focusing because unless the above condition is satisfied it is impossible to take a close-up photograph of an object in a distance closer than normal focusing range of the focusing lens. Now, when the object is in a distance closer than the normal focusing range, an image is formed by the focusing lens $L_1$ in front of the variator lens group $L_2$ as shown in FIG. 2(b). This image is imaged by the group $L_2$ inside the rear focal point $F_{2'}$ of the group $L_2$. When the groups $L_1$ to $L_4$ form the afocal zoom portion, it is necessary that the combined focal point $F_{34}$ of the groups $L_3$ and $L_4$ coincides with the image position of the object by the optical system up to the variator lens group in order to form the image on the film. In case of an ordinary photographing in which no near-range-focusing is done and the focusing is effected by the focusing lens group $L_1$, the position of the image by the groups $L_1$ and $L_2$ is always outside the focal point $F_{2'}$ of the group $L_2$ and this position coincides with the combined focal point $F_{34}$ of the groups $L_3$ and $L_4$ as shown in FIG. 2(a).

Therefore, when a near-range-focusing is taken, the combined focal point $F_{34}$ of the groups $L_3$ and $L_4$ which is outside the focal point $F_{2'}$ of the group $L_2$ must be moved to the inside of the focal point $F_{2'}$ of the group $L_2$.

Supposing the combined focal point $F_{34}$ of the groups $L_3$ and $L_4$ is at a distance l from the group $L_4$, the following relation is obtained in respect of the distance l.

$$l = \frac{1 + \phi_3 e - \phi_3 \phi_4 e^2}{\phi_3 + \phi_4 - \phi_3 \phi_4 e}$$

in which $\phi_3$ and $\phi_4$ respectively indicate the refractive power of the groups $L_3$ and $L_4$, e indicates the distance between the principal point of the group $L_3$ and that of the group $L_4$.

If l is differentiated by e, the following formula is given:

$$\frac{dl}{de} = \frac{\phi_3(1 - \phi_4 e)(2\phi_4 + \phi_3 - \phi_3 \phi_4 e)}{(\phi_3 + \phi_4 - \phi_3 \phi_4 e)}$$

$$= 1 - \frac{\phi_4^2}{(\phi_3 + \phi_4 - \phi_3 \phi_4 e)^2}$$

Now when $\phi_4$ is given the condition of $$0 < \phi_4 < \frac{-\sqrt{2} \phi_3}{(\sqrt{2} - 1) - \sqrt{2} \phi_3 e}$$

it becomes

-continued
$$\frac{dl}{de} < -1$$

Thereby, it becomes possible to make the moving amount of the group $L_3$ smaller than the actual movement of the combined focal point when the combined focal point $F_{34}$ of the group $L_3$ and $L_4$ is moved from the outside of the rear focal point $F_{2'}$ of the group $L_2$ to the inside of the focal point $F_{2'}$. Since dl/de is minus, the distance l becomes shorter as the distance between the group $L_3$ and $L_4$ is increased. Namely, the combined focal point $F_{34}$ of the groups $L_3$ and $L_4$ moves into the inside of the focal point $F_{2'}$ of the variator lens group $L_2$ from the outside thereof. When the distance between the groups $L_3$ and $L_4$ is increased with the group $L_4$ being fixed, the space for the movement of the group $L_2$ can be utilized commonly for zooming, and it is not necessary to provide a special space for near-range-focusing function and thus it is possible to prevent increase of the lens outer diameter.

The structure of a zoom barrel in which the zoom optical system is given a focusing function for a near-range-focusing by means of a cam section extending from a control cam of the compensating group is explained in reference to FIGS. 3 to 6.

Figure 3:
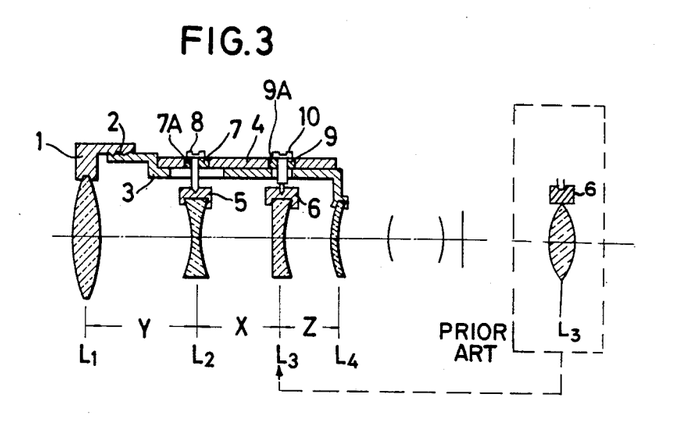
FIG. 3 is a cross-sectional view of a conventional zoom barrel.

FIG. 3 shows the cross-sectional view of a specific zoom barrel of a conventional zoom optical system which is not able to perform near-range-focusing. 1 is a focusing ring holding the focusing lens group $L_{1'}$ and a part 2 thereof is threaded with a helicoid screw and engaged with the helicoid portion of the fixed barrel 3 holding the lens group $L_4$ so that the focusing ring is rotatable around the fixed barrel 3 to effect focusing. 5 is a variator lens ring holding the variator lens group $L_2$ and a cylindrical roller 7 is fixed by a screw 8 at a part of the variator lens ring 5. 6 is a compensating ring holding the compensating lens group $L_3$ and a cylindrical roller 9 is fixed by a screw 10 at a part of the compensating lens ring 6. The rollers 7 and 9 are inserted in guide grooves provided in the fixed barrel 3 and these rollers 7, 9 are rotatable around the screws 8 and 10. 4 is a cam ring rotatable around the fixed barrel 3 and having cam grooves 7A and 9A for moving the lens groups $L_2$ and $L_3$ in the direction of the optical axis. The rollers 7 and 9 are engaged with the cam grooves 7A and 9A respectively.

Figure 4:
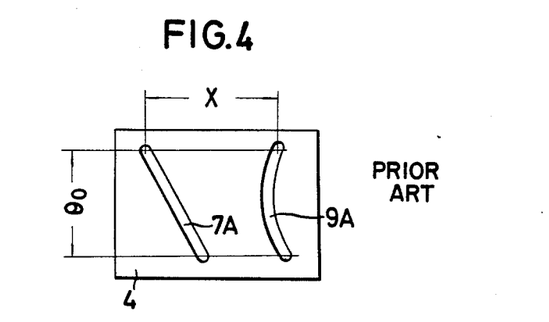
FIG. 4 shows a development of a conventional cam ring.

As shown in FIG. 4, the cam ring 4 is provided with the variable functional groove 7A and the compensating functional groove 9A in a continuous quadratic curve so as to change the relative distance X on the optical axis between the variator lens group $L_2$ and the compensating lens group $L_3$ within a certain rotation angle of $\theta_o$. Thus by rotating the cam ring 4 around the fixed barrel 3, the lens groups $L_2$ and $L_3$ are restricted by the cam grooves 7A and 9A and a member (not shown) restricting a rotating movement around the optical axis and is made in parallel in the direction of the optical axis, and thus an ordinary zooming photographing is conducted by changing the distances Y, X and Z among the lens groups.

In the present invention, the arrangement on the optical axis of each of the lens groups in case of near-range-focusing is as that the distance Y between the lens groups $L_1$ and $L_2$ at the completion of zooming operation is retained as it stands while the distances X and Z are changed. In the present invention, the simplification of the moving mechanism and operation ability are achieved by the construction of moving the compensating lens group only.

Figure 5:
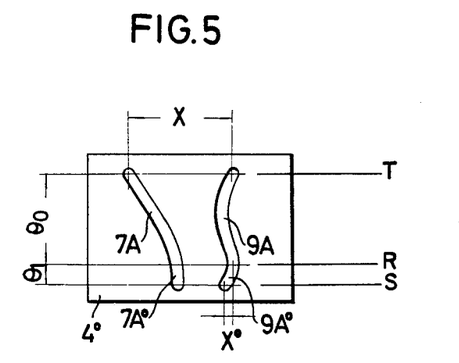
FIGS. 5 and 6 respectively show a development of a cam ring used in the present invention.

One embodiment of a zoom barrel which provides focusing function for near-range-focusing and is simple in its structure with a small number of components and thus suitable for high accuracy and easy operation is shown in FIG. 5. This embodiment enables near-range-focusing by changing only the cam ring 4 of the zoom barrel. In FIG. 5, cam grooves 7A and 9A necessary for ordinary zooming are provided on the cam ring 4° within the angle $\theta_o$ and cam grooves 7A° and 9A° are provided within the angle $\theta_1$ for moving the lens group along the optical axis and leaving the position of the lens group $L_2$ to be maintained constant on the optical axis. With this structure, the grooves 7A° and 9A° can be made by the same working method as for making the cam grooves 7A and 9A on the same cam ring 4 and thus it is possible to provide near-range-focusing function accurately and at low cost. In case of near-range focusing, only the compensating lens group $L_3$ is moved in the direction of the optical axis by the rotation of the cam ring 4° during the angle $\theta_{1'}$ while X and Z are changed with Y being retained constant, thus performing the prescribed purpose.

Figure 6:
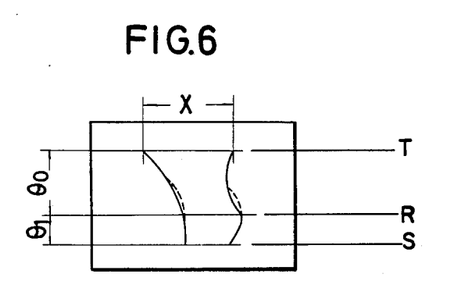

In case of the embodiment shown in FIG. 5, the joint portion between the grooves 7A, 9A and the grooves 7A°, 9A° takes a discontinued line as shown by the solid line in FIG. 6, when they are traced by the center points of the cam grooves. At this portion, the movement of the lens groups is not likely to be conducted smoothly, but it is clear that it is advantageous to render the joint portion into a smooth curve as shown by the dotted line in FIG. 6 instead of the solid line, or to provide a click or a zoom stopper, etc. at the end position (the point at the angle $\theta_o$) of the ordinary zooming, so as to avoid inconvenience in zooming operation.

The zoom barrel having the cam ring as shown in FIG. 5 and FIG. 6 has a high degree of accuracy, can be produced in mass at low cost, and is very advantageous for providing a zoom lens with near-range-focusing function without requiring any additional member.

As clearly understood from the above description, as the focusing function for near-range-focusing is given by the cam section extending from the control cam for zooming operation, in case of near-range-focusing, the present invention is very advantageous, as confirmed both by calculations and experiments, when near-range-focusing is realized by moving the compensating lens group.

A lens assembly structure having a zoom lens barrel given the near-range-focusing function as explained above is shown in FIG. 7 and FIG. 8. Explanation shall be given on a specific structure and its operation for changing over from the zoom operation to the near-range-focusing operation.

Figure 7:
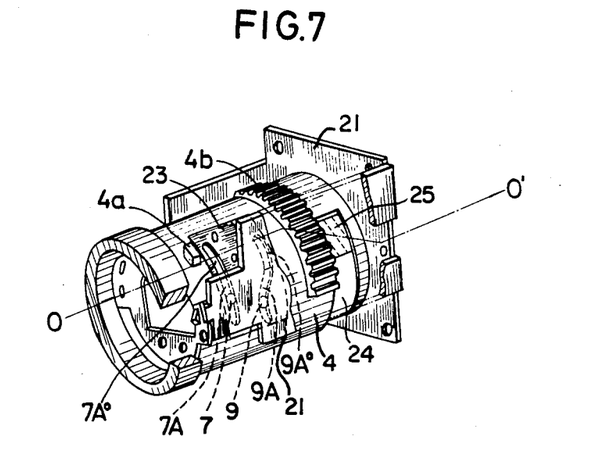
FIGS. 7 and 8 respectively show one embodiment of the present zoom lens structure useful for a near-ranging focusing.
Figure 8:
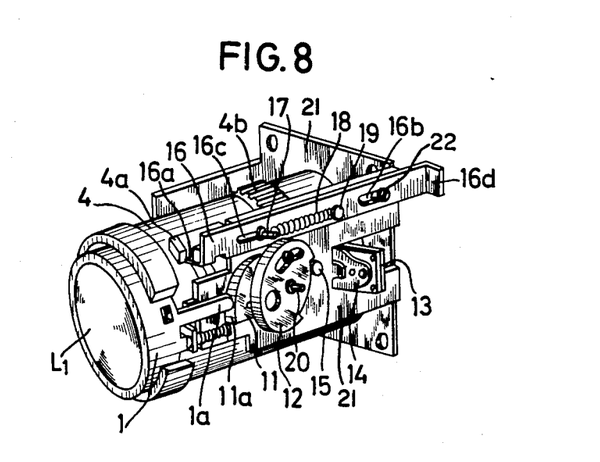

In FIGS. 7 and 8, same numerical reference are used for the components which are common to those in FIGS. 3 to 6. A focusing ring 1 holds the lens group $L_1$ movably along the optical axis. The projection 1a of the focusing ring 1 contacts with a cam surface 11a of a cam 11 supported by a pin 20 mounted on the outside frame 21 of the lens assembly structure. The cam surface is formed by an Archimedes' curve. A rotating member 12 for rotating the cam 11 is adjustably attached to the cam 11. Therefore, rotating the rotating member 12 with a knob outside the lens assembly structure rotates the cam 11. The rotation moves the focusing ring 1 through the projection 1a to effect focusing.

A stopper pin 15 mounted on the outside frame 21 restricts the rotation of the rotating member 12. A supporting plate 14 united with the outside frame 21 and supports a mirror 13 for the finder light path O-O' shown in FIG. 7. A toothed portion 4b around the circumference of the cam ring 4 engages a zooming gear provided at a driving member (not shown) to rotate the cam ring 4. A plate member 23 is attached on the circumference of the cam ring 4 and is provided with the same cam grooves 7A, 7A° and 9A, 9A° as those of the cam ring 4. The rollers 7 and 9 mentioned in reference to FIG. 3, project through the grooves 7A, 7A° and 9A, 9A° slidably on the inside circumference of the grooves. In FIG. 8, a sliding member 16 has elongated grooves 16b and 16c and is guided by the pins 17 and 22 mounted on the outside frame 21 and serves as a change-over means for changing from zooming operation $T_o$ near-range-focusing operation. This change-over means, namely the sliding member as shown is urged by a coil spring 18 provided between the pin 17 and the pin 19 mounted on the sliding member 16 so as to engage a top end portion 16a of the sliding member 16 with a stopper member 4a on the circumference of the cam ring 4. Near-range-focusing operation is possible by sliding the sliding member 16 against the spring 18 in the right side direction in FIG. 8 from the stop position R (in FIGS. 5 and 6) in the WIDE angle side, the stop position corresponding to the shortest focal length of the whole optical system set by the engagement of the top end 16a of the sliding member 16 with the stopper member 4a provided on the cam ring 4, to release the engagement with the stopper member 4a, and then by rotating the cam ring 4 from a stop position R on the WIDE angle side to a near-range focusing stop position S (in FIGS. 5 and 6) to drive the compensating lens group forward without changing the position of the variator lens group (that is without changing distance Y).

The change-over from zooming operation to near-range-focusing operation can be effected mechanically by a simple operation by pulling back the end portion 16d of the sliding member 16 and by the aid of a change-over lever etc. provided outside a motion picture camera in which the lens assembly structure of the present invention is incorporated.

Further, the cam ring 4 is provided with an opening 24 on its side surface. This opening 24 is so shaped as not to hinder the view finder light path O-O' in a domain extending from the stop position T (in FIGS. 5 and 6) on the TELE PHOTO side (the stop position corresponding to the longest focal length of the whole optical system, and exceeding beyond the stop position R on the WIDE angle side and arriving at the stop position S corresponding to the closest photographing of this zoom lens system, that is, at the time of macrophotography.

A macrophotography data indicator such as a colour filter (this is shown by 25 in FIG. 7) is provided within a zone corresponding to the rotation domain of a cam ring 4 (this represents in itself a range of macrophotography) extending from the above mentioned stop position R (stop position on the WIDE angle side) of this opening 24 to the stop position S for shortest distance photographing in macrophotography. Further, since at the time of near-range-photography, this data indicator (colour filter) 25 is inserted in the view finder light path O-O', the state of near-range-photography will be indicated within the view finder of the camera. Furthermore, with this arrangement, the indication in the view finder light path O-O' of changes in image expansion ratio or data concerning rotation amount of the zoom ring, etc. corresponding to a zoom ratio of the camera set, can easily be effected.

The opening 24 perforated on one part of the cam ring 4 is available to pass the light flux of the finder and is formed in a shape corresponding to cam grooves 7A, 7A° and 9A, 9A° which, as stated above, are formed on the cam ring 4 so as not to hinder the finder, light path O-O' at the rotation of the cam ring 4. The foregoing colour filter 25 is provided on the zone corresponding to the cam grooves 7A° and 9A° (cam grooves for near-range focusing) within the opening 24, while the filter is not inserted in the zone corresponding to said cam grooves 7A and 9A formed within the opening 24.

Accordingly, when the cam ring 4 is disposed on the position for effecting the zooming operation, the colour filter 25 is not inserted in the finder light path O-O', however, when the cam ring 4 is rotated still further to reach the position for effecting near-range focusing operation, the colour filter 25 is adapted to be inserted automatically in the finder light path O-O' so as to vary the colour of the finder light.

In this manner, a camera equipped with zoom lens system according to the present invention provides such a favourable effect to those who are using said camera that they can clearly distinguish the transition of the lens system as mentioned above from the zooming operation to the near-range-focusing operation as well as a reverse transition of the above sequence when they are observing through the view finder of the camera.

As understood from the above description, the zoom lens barrel having the cam ring as shown in FIGS. 5 to 8 is very advantageous for mass-production of a zoom lens assembly structure having near-range-focusing function at low cost with a high degree of accuracy without requiring any additional separate member.

As the present invention provides a focusing function for a near-range-focusing by means of the cam section extending from the control cam for zooming operation, it is possible to effect near-range photographing by moving backward the compensating lens group in a zoom optical system comprising a focusing lens group, a negative variator lens group and a positive compensating lens group, and thus the present invention is very advantageous for use in a cine camera etc.

What is claimed is:

1. A zoom lens system comprising:
   (a) a focusing lens group having an optical axis and being movable along the optical axis for normal range focusing;
   (b) means for shifting the focusing lens group along the optical axis for normal range focusing;
   (c) a variator lens group being movable along the optical axis for varying the focal length of the whole lens system;
   (d) a compensator lens group being movable along the optical axis for compensating the image plane shift caused by the movement of the variator lens group;
   (e) a cam ring being rotatable around the optical axis and having:
      (1) first and second zooming cam grooves within a first predetermined rotating angle for defining movement of the variator lens group and the compensator lens group according to a first predetermined relationship for zooming operation in a normal focusing range, said first zooming cam groove and said second zooming cam groove being formed differently from each other so that said first zooming cam groove shifts the variator lens group along the optical axis in order to vary the focal length of the whole system at the time of the rotation of the cam ring within the first rotating angle and said second zooming cam groove shifts the compensator lens group along the optical axis in order to compensate the image plane shift caused by the movement of the variator lens group at the time of the rotation of the cam ring within the first rotating angle;

(2) a first and a second macrophotographic cam groove within a second predetermined rotating angle following said first rotating angle for defining movement of the variator lens group and the compensator lens group according to a second predetermined relationship for macrophotographing operation in a close focusing range closer than the normal focusing range, said first macrophotographing cam groove and said second macrophotographic cam groove being provided at a portion extended from one end portion of the first zooming cam groove and at a portion extended from one end portion of the second zooming cam groove respectively so as to be continuously shifting from the zooming operation to the macrophotographing operation according to the rotation of the cam ring from the first rotating angle to the second roating angle, said first macrophotographic cam groove being formed so as to position its center line substantially within a plane substantially including the central point of the end portion of the first zooming cam groove and perpendicularly crossing the optical axis in order to maintain the variator lens group stationary at a position corresponding to the end of said first predetermined relationship at the time of the rotation of the cam ring within the second rotating angle, and said second macrophotographic cam groove being formed so as to shift its center line gradually from a plane substantially including the central point of the end portion of the second zooming cam groove and perpendicularly crossing the optical axis in order to shift the compensator lens group along the optical axis further from a position corresponding to the end of said first predetermined relationship at the time of the rotation of the cam ring within the second rotating angle; and (3) an opening for defining a finder optical path;

(f) releasable locking means for restricting the rotation of the cam ring between said first and second rotating angles, said cam ring being rotatable continuously from the first rotating angle to the second rotating angle upon the release of said locking means; and (g) an indicating means for indicating macrophotographing information into the finder optical path, said indicating means including a colored filter member disposed in said opening of the cam ring at a portion corresponding to the second rotating angle;

thereby, the variator lens group and the compensator lens group are mutually shifted along the optical axis according to the first predetermined relationship in the normal focusing range by the rotation of the cam ring within the first rotating angle for effecting zooming, and further, when the locking means is released, the compensator lens group only is independently shifted along the optical axis from the position corresponding to the end of the first predetermined relationship while the variator lens group is maintained in a stationary state at the position corresponding to the end of the first predetermined relationship in the close focusing range by the rotation of the cam ring within the second rotating angle for effecting macrophotographing and also the indication of the macrophotographing operation is achieved automatically in response to the rotation of the cam ring within the second rotating angle by the insertion of the colored filter member into the finder optical path.

2. A zoom lens system according to claim 1, further comprising:

a rear fixed lens group disposed behind said compensator lens group along the optical axis;

wherein said focusing lens group, said variator lens group, said compensator lens group and said rear fixed lens group respectively have a positive refractive power, a negative refractive power, a negative refractive power and a positive refractive power and wherein especially the compensator lens group and the rear fixed lens group together satisfy the following condition so that the displacement of the compensator lens group becomes smaller than the movement of combined focal point of the compensator lens group and the rear fixed lens group at the time of macrophotographing operation:

$$\phi_4 < \frac{-\sqrt{2}\, \phi_3}{(\sqrt{2} - 1) - \sqrt{2}\, \phi_{3e}}$$

wherein:
$\phi_3$ = refractive power of the compensator lens group
$\phi_4$ = refractive power of the rear fixed lens group
$e$ = distance between the principal point of the compensator lens group and that of the rear lens group.

3. A lens assembly comprising:
(a) a first movable lens group having an optical axis and being movable along the axis for normal range focusing;
(b) means for shifting said first lens group along the optical axis for the normal range focusing;
(c) a zoom optical means including second and third movable lens groups being movable along the optical axis for effecting zooming;
(d) a rotatable control means for controlling the movement of said second and third lens groups, said control means being rotatable around the optical axis and having:
  (1) a first control portion within a first predetermined rotating angle for moving the second and third lens groups according to a predetermined relationship for effecting the zooming;
  (2) a second control portion within a second predetermined rotating angle following said first rotating angle for moving only the third lens group along the optical axis while maintaining the second lens group at a position corresponding to one end of said predetermined relationship so as to effect macrophotographing in a close focusing range closer than a normal focusing range; and (3) an opening for allowing the passage of a finder light beam along a finder optical path; and (e) a coloring means for coloring at least a portion of the finder light beam passing through said opening of the control means so as to indicate the macrophotographing state, said coloring means being provided in the opening of the control means at a portion corresponding to the second rotating angle;

thereby the indication of the macrophotographing state is achieved automatically in response to the rotation of the control means within the second rotating angle by coloring at least a portion of the finder light beam.

4. A lens assembly according to claim 3, wherein said coloring means is formed as a colored filter for coloring at least a portion of the finder light beam passing through the opening of the control means.

5. A lens assembly according to claim 3, further comprising:

releasable locking means for restricting the rotation of said control means between said first and second rotating angles, said control means being rotatable continuously from the first rotating angle to the second rotating angle upon the release of said locking means.

6. A lens assembly according to claim 3, further comprising:

a fourth fixed lens group disposed behind said third lens group along the optical axis;

wherein said first, second, third and fourth lens groups respectively have a positive refractive power, a negative refractive power, a negative refractive power and a positive refractive power and wherein especially the third and fourth lens groups together satisfy the following condition so that the displacement of the third group becomes smaller than the movement of the combined focal point of the third and fourth lens groups at the time of macrophotographing operation:

$$\phi_4 < \frac{-\sqrt{2}\,\phi_3}{(\sqrt{21} - 1) - \sqrt{2}\,\phi_3 e}$$

wherein:

$\phi_3$ = refractive power of the third lens group
$\phi_4$ = refractive power of the fourth lens group
$e$ = distance between the principal point of the third lens group and that of the fourth lens group.

7. A lens assembly comprising:

(a) a first movable lens group having an optical axis and being movable along the axis for focusing in a normal focusing range;

(b) means for shifting said first lens group along the optical axis for the normal range focusing:

(c) a zoom optical means including second and third movable lens groups along the optical axis for effecting zooming;

(d) a control means for controlling the movement of said second and third lens groups, said control means having:

(1) a first control portion for moving the second and third lens groups according to a predetermined relationship for effecting the zooming, and (2) a second control portion following said first control portion for moving only the third lens group along the optical axis while maintaining the second lens group at a fixed position so as to effect focusing in a close focusing range closer than the normal focusing range; and (e) a fourth fixed lens group disposed behind said third lens group along the optical axis;

wherein said first, second, third and fourth lens groups respectively have a positive refractive power, a negative refractive power, a negative refractive power and a positive refractive power and wherein especially the third and fourth lens groups together satisfy the following condition so that the displacement of the third lens group becomes smaller than the movement of the combined focal point of the third and fourth lens groups at the time of focusing operation in the close focusing range:

$$\phi_4 < \frac{-\sqrt{2}\,\phi_3}{(\sqrt{21} - 1) - \sqrt{2}\,\phi_3 e}$$

wherein $\phi_3$ = refractive power of the third lens group
$\phi_4$ = refractive power of the fourth lens group
$e$ = distance between the principal point of the third lens group and that of the fourth lens group.

8. A lens assembly according to claim 7, wherein said control means is rotatable around the optical axis within first and second predetermined rotating angles for controlling the movement of said second and third lens groups;

and wherein said first control portion is provided within said first predetermined rotating angle while said second control portion is provided within said second predetermined rotating angle so as to move only the third lens group from a position corresponding to one end of said predetermined relationship while maintaining the second lens group at a position corresponding to one end of said predetermined relationship.

9. A lens assembly according to claim 8, further comprising:

releasable locking means for restricting the rotation of said control means between said first and second rotating angles, said control means being rotatable continuously from the first rotating angle to the second rotating angle upon the release of said locking means.

10. A lens assembly according to claim 9, wherein said control means further has an opening for allowing the passage of a finder light beam along a finder optical path.

11. A lens assembly according to claim 10, further comprising:

a coloring means for coloring at least a portion of the finder light beam passing through said opening of the control means so as to indicate the close range focusing state, said coloring means being provided in the opening of the control means at a portion corresponding to the second rotating angle;

thereby the indication of the close range focusing state is achieved automatically in response to the rotation of the control means within the second rotating angle by coloring at least a portion of the finder light beam.

12. A lens assembly according to claim 11, wherein said coloring means is formed as a colored filter for coloring at least a portion of the finder light beam passing through the opening of the control means.

13. A zoom lens system comprising:
(a) a movable focusing lens group having an optical axis;
(b) means for shifting said focusing lens group along the optical axis for normal range focusing;
(c) a movable variator lens group disposed along the optical axis;
(d) a movable compensator lens group disposed along the optical axis;
(e) cam means rotatable around the optical axis and having:
  (1) first and second cam surfaces within a first rotating angle for defining movement of the variator lens group and the compensator lens group according to a predetermined relationship for zooming operation in a normal focusing range, said first and second cam surfaces having different shapes from each other so as to shift the variator lens groups and the compensator lens group in a different way for zooming operation; and
  (2) third and fourth cam surfaces within a second rotating angle following said first rotating angle for defining movement of the variator lens group and the compensator lens group for focusing in a close focusing range closer than the normal focusing range, said third cam surface and said fourth cam surface being provided at an extended portion extended from one end portion of the first cam surface and at an extended portion extended from one end portion of the second cam surface respectively so as to enable the cam means to continuously move from the zooming operation to the close range focusing operation by the rotation in a predetermined direction, said third cam surface being formed so as to maintain the variator lens group stationary at one end position of the predetermined relationship for zooming operation at the time of the rotation of the cam means within the second rotating angle, and said fourth cam surface being formed so as to shift the compensator lens group further along the optical axis from one end position of the predetermined relationship for zooming operation at the time of the rotation of the cam means within the second rotating angle; and
(f) a fixed rear lens group disposed behind said compensator lens group along the optical axis;
wherein said focusing lens group, said variator lens group, said compensator lens group and said rear fixed lens group respectively have a positive refractive power, a negative refractive power, a negative refractive power and a positive refractive power and wherein especially the compensator lens group and the rear lens group together satisfy the following condition so that the displacement of the compensator lens group becomes smaller than the movement of combined focal point of the compensator lens group and the rear lens group at the time focusing operation in the close focusing range:

$$\phi_4 < \frac{-\sqrt{2}\,\phi_3}{(\sqrt{2}-1) - \sqrt{2}\,\phi_3 e}$$

wherein:
$\phi_3$ = refractive power of the compensator lens group
$\phi_4$ = refractive power of the rear fixed lens group
$e$ = distance between the principal point of the compensator lens group and that of the rear lens group.

14. A zoom lens system comprising:
(a) a focusing lens group having an optical axis and being movable along the optical axis for normal range focusing;
(b) means for shifting the focusing lens group along the optical axis for normal range focusing;
(c) a variator lens group being movable along the optical axis for varying the focal length of the whole lens system;
(d) a compensator lens group being movable along the optical axis for compensating the image plane shift caused by the movement of the variator lens group;
(e) a cam ring rotatable around the optical axis and having:
  (1) first and second zooming cam grooves within a first predetermined rotating angle for defining movement of the variator lens group and the compensator lens group according to a first predetermined relationship for zooming operation in a normal focusing range, said first zooming cam groove and said second zooming cam groove being formed differently from each other so that said first zooming cam groove shifts the variator lens group along the optical axis in order to vary the focal length of the whole system at the time of the rotation of the cam ring within the first rotating angle and said second zooming cam groove shifts the compensator lens group along the optical axis in order to compensate the image plane shift caused by the movement of the variator lens group at the time of the rotation of the cam ring within the first rotating angle; and
  (2) first and second macrophotographic cam grooves within a second predetermined rotating angle following said first rotating angle for defining movement of the variator lens group and the compensator lens group according to a second predetermined relationship for macrophotographing operation in a close focusing range closer than the normal focusing range, said first macrophotographing cam groove and said second macrophotographic cam groove being provided at a portion extended from one end portion of the first zooming cam groove and at a portion extending from one end portion of the second zooming cam groove respectively so as to be continuously shifting from the zooming operation to the macrophotographing operation according to the rotation of the cam ring from the first rotating angle to the second rotating angle, said first macrophotographic cam groove being formed so as to position its center line substantially within a plane substantially including the central point of the end portion of the first zooming cam groove and perpendicularly crossing the optical axis in order to maintain the variator lens group stationary at a position corresponding to the end of said first predetermined relationship at the time of the rotation of the cam ring within the second rotating angle, and said second macrophotographic cam groove being formed so as to shift its center line gradually from a plane substantially including the central point of the end portion of the second zooming cam groove and perpendicularly crossing the optical axis in order to shift the compensator lens group along the optical axis further from a position corresponding to the end of said first predetermined relationship at the time of the rotation of the cam ring within the second rotating angle; and (f) a rear fixed lens group disposed behind said compensator lens group along the optical axis;

wherein said focusing lens group, said variator lens group, said compensator lens group and said rear fixed lens group respectively have a positive refractive power, a negative refractive power, a negative refractive power and a positive refractive power and wherein especially the compensator lens group and the rear fixed lens group together satisfy the following condition so that the displacement of the compensator lens group becomes smaller than the movement of combined focal point of the compensator lens group and the rear fixed lens group at the time of macrophotographing operation:

$$\phi_4 < \frac{-\sqrt{2}\,\phi_3}{(\sqrt{2}-1) - \sqrt{2}\,\phi_3 e}$$

wherein:
$\phi_3$ = refractive power of the compensator lens group
$\phi_4$ = refractive power of the rear fixed lens group
$e$ = distance between the principal point of the compensator lens group and that of the rear lens group.

15. A zoom lens system according to claim 14, wherein said focusing lens group, said variator lens group and said compensator lens group respectively have a positive, a negative and a negative refractive power.

* * * * *

UNITED STATES PATENT AND TRADEMARK OFFICE
CERTIFICATE OF CORRECTION

PATENT NO. : 4,132,463
DATED : January 2, 1979
INVENTOR(S) : Keiichi Sakaguchi and Atsushi Someya It is certified that error appears in the above-identified patent and that said Letters Patent is hereby corrected as shown below:

Column 9, change the condition appearing between lines 46 through 48 as follows:

$$-- \phi_4 < \frac{-\sqrt{2}\phi_3}{(\sqrt{2}-1) - \sqrt{2}\phi_3 e} \quad --$$

Column 10, change the condition appearing between lines 24 through 26 as follows:

$$-- \phi_4 < \frac{-\sqrt{2}\phi_3}{(\sqrt{2}-1) - \sqrt{2}\phi_3 e} \quad --$$

Signed and Sealed this

Twelfth Day of July 1983

[SEAL]

Attest:

GERALD J. MOSSINGHOFF

Attesting Officer

Commissioner of Patents and Trademarks